United States Patent
Sudou

(10) Patent No.: US 8,055,289 B2
(45) Date of Patent: Nov. 8, 2011

(54) SIGNAL PROCESSING CIRCUIT AND SIGNAL PROCESSING METHOD

(75) Inventor: Eiji Sudou, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 1158 days.

(21) Appl. No.: 11/774,421

(22) Filed: Jul. 6, 2007

(65) Prior Publication Data

US 2008/0008332 A1    Jan. 10, 2008

(30) Foreign Application Priority Data

Jul. 7, 2006    (JP) ................. 2006-188365

(51) Int. Cl.
*H04B 15/00*    (2006.01)
*H04B 17/00*    (2006.01)
(52) U.S. Cl. .............. 455/506; 455/65; 455/226.3
(58) Field of Classification Search .......... 455/506, 455/65, 63.1, 135, 222, 226.3, 278.1, 296
See application file for complete search history.

(56) References Cited

U.S. PATENT DOCUMENTS

| | | | |
|---|---|---|---|
| 6,233,443 B1 * | 5/2001 | Brommer | 455/296 |
| 6,255,901 B1 * | 7/2001 | Steinhagen et al. | 329/348 |
| 6,993,311 B2 * | 1/2006 | Li et al. | 455/307 |
| 7,116,730 B2 * | 10/2006 | Kunleda et al. | 375/324 |
| 7,885,359 B2 * | 2/2011 | Meltzer | 375/320 |
| 2005/0124310 A1 * | 6/2005 | Yamamoto et al. | 455/296 |
| 2008/0287086 A1 * | 11/2008 | Gozen | 455/311 |

FOREIGN PATENT DOCUMENTS

| | | | |
|---|---|---|---|
| JP | 04056529 A | * | 2/1992 |
| JP | 2001-285096 A | | 10/2001 |
| JP | 2002-271219 A | | 9/2002 |
| JP | 2005-277565 A | | 10/2005 |

OTHER PUBLICATIONS

Shimizu Hiroyuki, Radio Receiver, Patent Abstracts of Japan, Date Feb. 24, 1992, Publication No. 04-056529, 1 page.*

* cited by examiner

*Primary Examiner* — Sonny Trinh
(74) *Attorney, Agent, or Firm* — Sughrue Mion, PLLC

(57) ABSTRACT

A signal processing circuit includes a demodulator to demodulate a received signal and output a demodulated signal, a filter to output a signal corresponding to a prescribed frequency component of the demodulated signal, a blending unit to blend the demodulated signal with an output signal of the filter at a prescribed blending ratio, an electric field strength change amount detection unit to detect a change in electric field strength and output an electric field strength change amount, and a blending ratio determination unit to determine the prescribed blending ratio according to the electric field strength change amount.

20 Claims, 12 Drawing Sheets

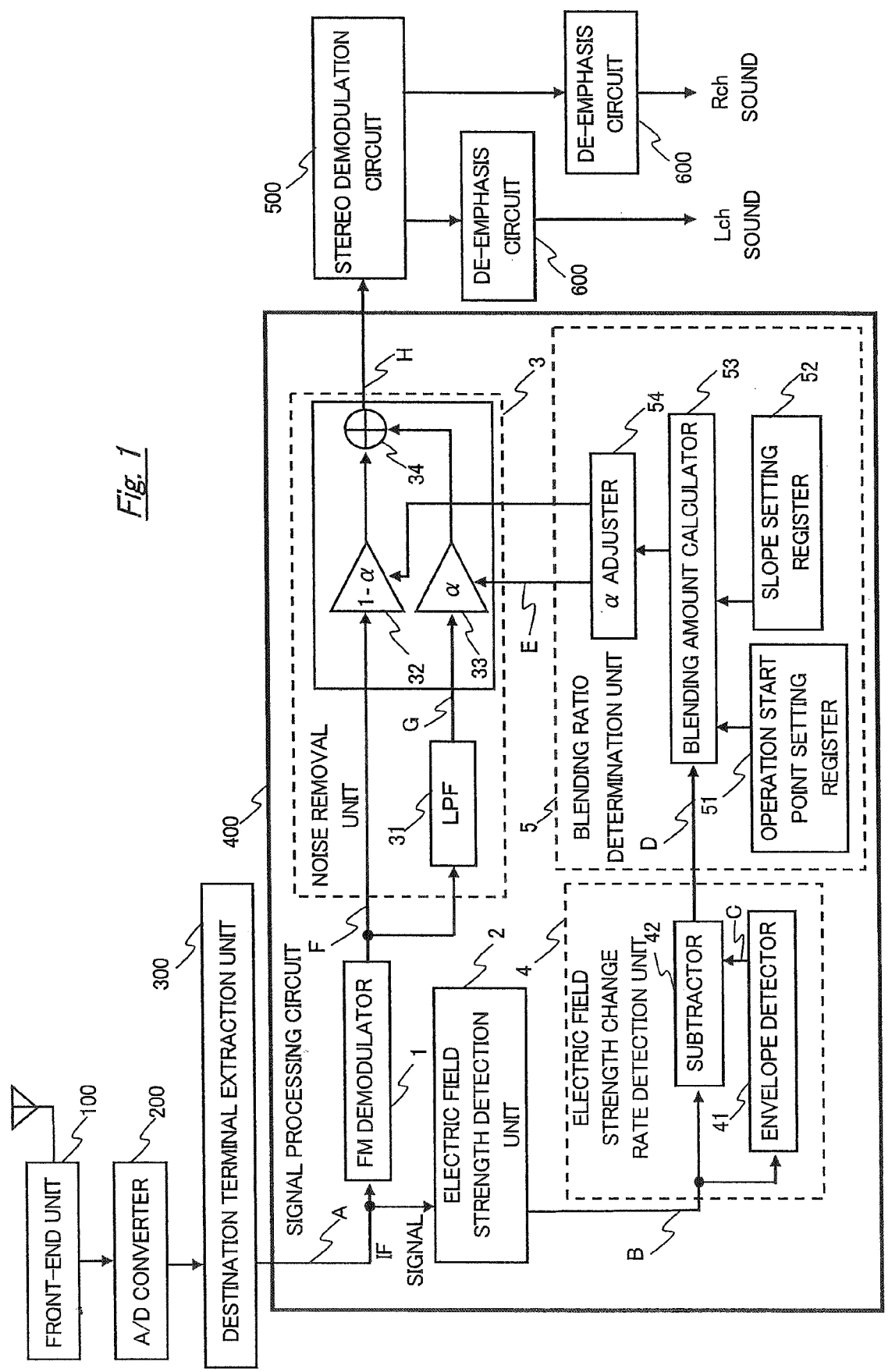

*Fig. 2A* IF SIGNAL
*Fig. 2B* ELECTRIC FIELD STRENGTH SIGNAL
*Fig. 2C* ENVELOPE SIGNAL (DOTTED LINE CORRESPONDS TO Fig. 2B)
*Fig. 2D* DROP AMOUNT DETECTION RESULT
*Fig. 2E* BLENDING RATIO
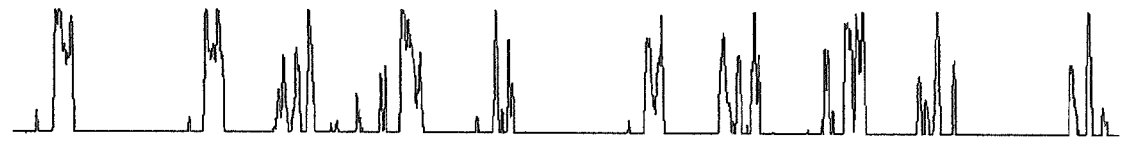
*Fig. 2F* DEMODULATED SIGNAL
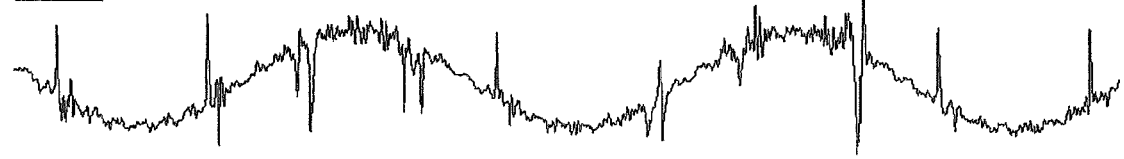
*Fig. 2G* LPF OUTPUT
*Fig. 2H* STEREO COMPOSITE SIGNAL

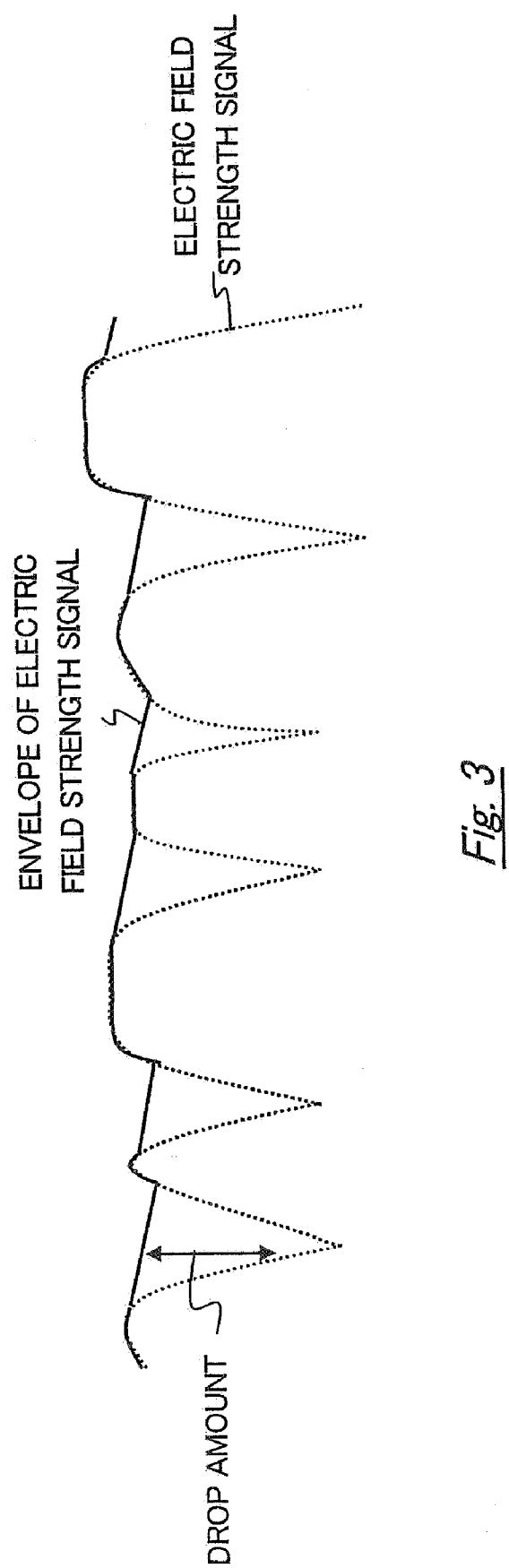

SIGNAL PROCESSING CIRCUIT AND SIGNAL PROCESSING METHOD

BACKGROUND OF THE INVENTION

1. Field of the Invention

The present invention relates to a signal processing circuit and, particularly, to a signal processing circuit and a signal processing method for removing noise due to multipath.

2. Description of Related Art

A receiving device in FM radio or the like performs noise reduction due to multipath. A receiving device usually receives a radio wave that is transmitted through a plurality of paths. The noise due to multipath is noise that is generated due to a difference in the time of receipt among a plurality of transmission paths. Japanese Unexamined Patent Publication Nos. 2001-285096 (Nakazawa) and 2002-271219 (Gamo) disclose a technique for reducing such noise.

Japanese Unexamined Patent Publication Nos. 2005-277565 (Saito et al.) also discloses a technique for reducing multipath noise. FIG. 11 is a block diagram showing the configuration of the circuit which is described in Saito et al. The circuit taught by Saito et al. includes a noise attenuation processing unit 140, an attenuation factor setting unit 142, a differential threshold setting unit 144, a modulation factor detection unit 146, a multipath detection filter 148, a level detection unit 150, an electric field strength detection unit 152, a filter coefficient setting unit 154, a multipath detection unit 156, an output control unit 158.

The noise attenuation processing unit 140 detects the period when multipath noise occurs, and it also attenuates an input stereo composite signal and outputs it to the output control unit 158.

The attenuation factor setting unit 142 sets an attenuation factor of a stereo composite signal according to an output of the modulation factor detection unit 146, an output of the level detection unit 150 and an output of the electric field strength detection unit 152, and outputs the attenuation factor to the noise attenuation processing unit 140. The attenuation factor setting unit 142 includes an attenuation factor table 162 to set an attenuation factor. By reference to the attenuation factor table 162, the attenuation factor setting unit 142 sets an attenuation factor according to the level of an input signal. The attenuation factor setting unit 142 further includes a time controller 160 that controls time based on a noise detection signal which is output from the noise attenuation processing unit 140.

The differential threshold setting unit 144 sets a threshold to serve as a reference to judge a difference according to an output of the modulation factor detection unit 146, an output of the level detection unit 150 and an output of the electric field strength detection unit 152, and outputs the threshold to the noise attenuation processing unit 140. The differential threshold setting unit 144 includes a threshold table 164. By reference to the threshold table 164, the differential threshold setting unit 144 sets a threshold.

The modulation factor detection unit 146 detects the amplitude of a stereo composite signal, which is the intensity of the stereo composite signal, and outputs the detected intensity to the attenuation factor setting unit 142 and the differential threshold setting unit 144.

The multipath detection filter 148 extracts the AC component around 19 kHz, for example, and outputs it. The multipath detection filter 148 adjusts the filter properties according to an output of the filter coefficient setting unit 154.

The level detection unit 150 outputs a signal that indicates a change in the envelope of a signal which is output from the multipath detection filter 148 to the attenuation factor setting unit 142 and the differential threshold setting unit 144. The electric field strength detection unit 152 detects electric field strength. The electric field strength detection unit 152 outputs a signal that indicates the electric field strength to the attenuation factor setting unit 142 and the differential threshold setting unit 144.

The filter coefficient setting unit 154 sets the filter properties of the multipath detection filter 148 according to an output of the electric field strength detection unit 152. The multipath detection unit 156 detects the generation of multipath noise based on an output of the level detection unit 150. The multipath detection unit 156 outputs a control signal that indicates the generation of multipath noise to the output control unit 158.

The output control unit 158 receives an output signal of the noise attenuation processing unit 140 and a stereo composite signal. The output control unit 158 sets an amplification factor of the output signal of the noise attenuation processing unit 140 and the stereo composite signal according to a control signal. Based on the amplification factor, the output control unit 158 adds the amplified output signal of the noise attenuation processing unit 140 and the amplified stereo composite signal together and outputs the result. The output control unit 158 includes an amplifier 166 with an amplification factor of "a" that sets the level of a stereo composite signal, an amplifier 168 with an amplification factor of "b" that sets the level of an output signal of the noise attenuation processing unit 140, and an adder 170 that adds an output of the amplifier 166 and an output of the amplifier 168 together and outputs the result.

The output control unit 158 increases the amplification factor b if the control signal indicates the detection of multipath noise, and it increases the amplification factor a if the control signal does not indicate the detection of multipath noise. FIG. 12 shows an example of the output control by the output control unit 158. The value of the amplification factor a of the amplifier 166 is designated by a solid line, and the value of the amplification factor b of the amplifier 168 is designated by a dotted line.

When t<t1, a=1 and b=0. In such a case, no multipath noise is detected, and the output control unit 158 outputs a stereo composite signal only.

When t1<t<t2, the amplification factor a decreases gradually and the amplification factor b increases accordingly because multipath noise is detected at the time t1. Thus, the output of the stereo composite signal from the output control unit 158 decreases as time elapses, and the output signal of the noise attenuation processing unit 140 increases as time elapses.

When t2<t, a=0, and b=1. Therefore, the output control unit 158 outputs the output signal of the noise attenuation processing unit 140 only.

The output control unit 158 performs the same control in the event of the transition from the state where multipath noise is detected to the state where multipath noise is no longer detected.

In this manner, upon changing the output, the output control unit 158 implements the fade-in fade-out control of the stereo composite signal and the output signal from the noise attenuation processing unit 140, thereby preventing the output from a signal processing circuit 136 to be discontinuous.

However, the technique described in Saito et al. switches between a demodulated signal and an output of the noise attenuation processing unit 140 based on the presence or absence of multipath which is detected by the multipath detection filter 148, the level detection unit 150 and the multipath detection unit 156. Specifically, if multipath exceeds a threshold, the signal processing circuit 136 selects and outputs the signal whose noise is attenuated by the noise attenuation processing unit 140 as shown in the region of t2<t in FIG. 12. On the other hand, if multipath falls below the threshold, the signal processing circuit 136 outputs only the stereo composite signal whose noise is not attenuated at all as shown in the region of t<t1 in FIG. 12. Accordingly, even if multipath occurs, the signal whose noise is not removed at all is output unless the multipath exceeds a threshold. Further, if the presence of multipath is detected, the signal processing circuit 136 always outputs the output signal from the noise attenuation processing unit 140 only, so that a signal with a fixed degree of attenuation is output regardless of the level of multipath.

The present inventor has recognized that the technique taught by Saito et al. outputs a signal without any noise attenuation or a signal with excessive noise attenuation with respect to an original demodulated signal for a long period of time, which can cause adverse effects such as degradation of stereo separation and production of muffled sound.

The present inventor has also recognized that the technique taught by Saito et al. can cause unnecessary loss of sound quality for the sake of multipath noise reduction.

SUMMARY

In one embodiment, there is provided a signal processing circuit that includes a demodulator to demodulate a received signal and output a demodulated signal, a filter to output a signal corresponding to a prescribed frequency component of the demodulated signal, a blending unit to blend the demodulated signal with an output signal of the filter at a prescribed blending ratio, an electric field strength change amount detection unit to detect a change in electric field strength and output an electric field strength change amount, and a blending ratio determination unit to determine the prescribed blending ratio according to the electric field strength change amount.

In another embodiment, there is provided a signal processing circuit that blends a demodulated signal demodulated from a received signal and a signal corresponding to a specified frequency component of the demodulated signal at a prescribed blending ratio. In the signal processing circuit, the blending ratio is determined based on a change amount of electric field strength of the received signal.

In another embodiment, there is provided a signal processing method that blends a demodulated signal demodulated from a received signal and a signal corresponding to a specified frequency component of the demodulated signal. The method includes detecting a change amount of electric field strength of the received signal, calculating a blending ratio of the demodulated signal and the signal corresponding to a specified frequency component of the demodulated signal based on the change amount of electric field strength, and outputting a signal generated by blending the demodulated signal and the signal corresponding to a specified frequency component of the demodulated signal at the blending ratio.

The present invention enables suppression of unnecessary loss of sound quality by detecting an electric field strength change amount and determining a blending ratio based on the electric field strength change amount.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 1 is a block diagram showing a receiving device according to a first embodiment of the present invention;

FIGS. 2A to 2H are views showing the waveforms output from the components according to the first embodiment;

FIG. 3 is a view to describe the operation of a drop amount detection unit in further detail;

DETAILED DESCRIPTION OF PREFERRED EMBODIMENTS

Figure 4:
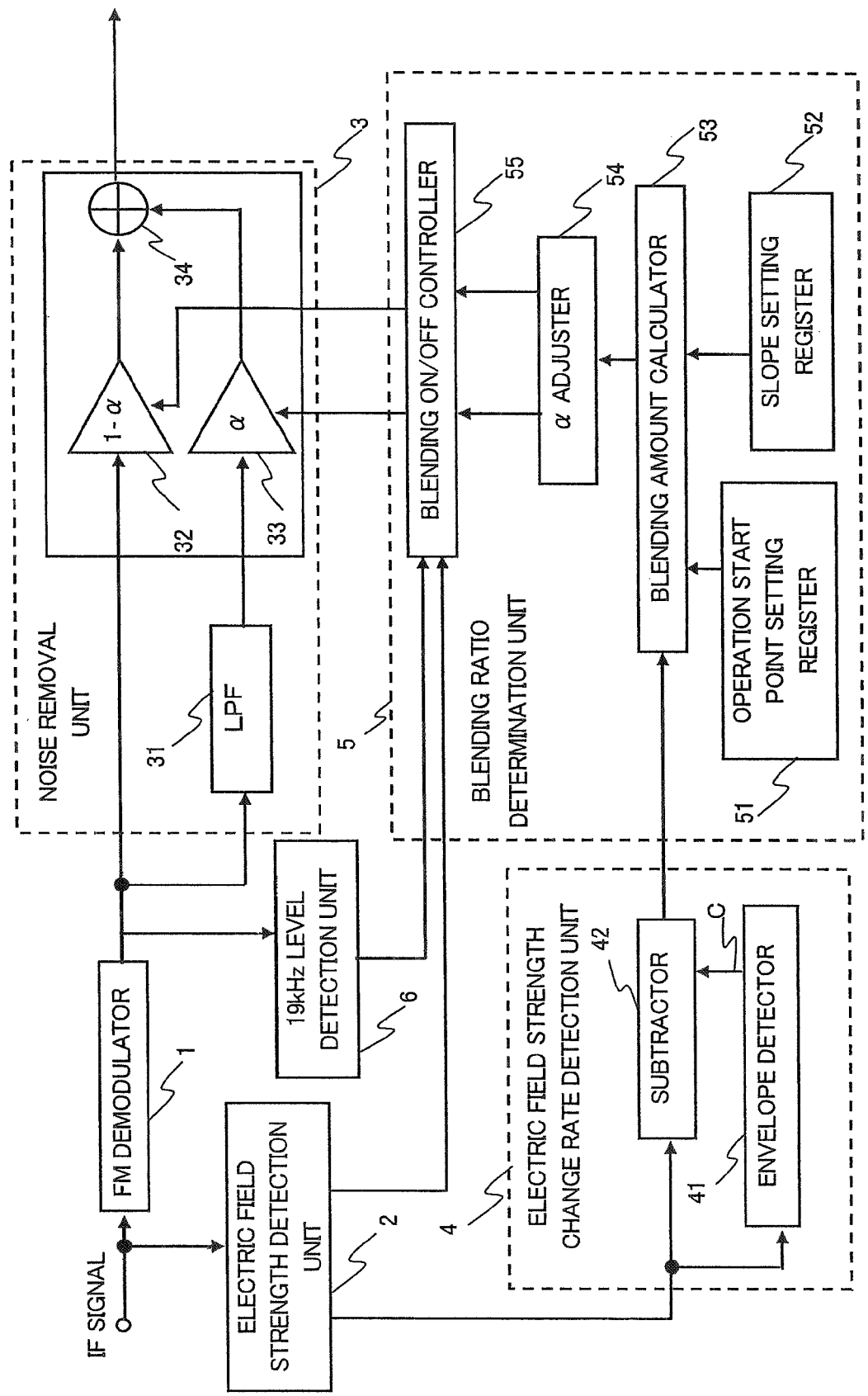
FIG. 4 is a block diagram showing a signal processing circuit according to a second embodiment of the present invention.

The invention will be now described herein with reference to illustrative embodiments. Those skilled in the art will recognize that many alternative embodiments can be accomplished using the teachings of the present invention and that the invention is not limited to the embodiments illustrated for explanatory purposes.

First Embodiment

A first embodiment of the present invention is described hereinafter with reference to the drawings. FIG. 1 is a block diagram showing a receiving device that includes a signal processing circuit according to the first embodiment of the present invention. The receiving device shown in FIG. 1 is a receiving device of FM radio, for example, and it reproduces voice data or the like from a signal that is received as a radio wave and outputs them. The receiving device of this embodiment includes a front-end unit 100, an A/D converter 200, a destination terminal extraction unit 300, a signal processing circuit 400, a stereo demodulation circuit 500, and a de-emphasis circuit 600.

The front-end unit 100 converts a signal that is received by an antenna into an analog intermediate frequency (IF) signal and outputs the analog IF signal. The A/D converter 200 converts the analog IF signal that is output from the front-end unit 100 into a digital IF signal and outputs the digital IF signal. The destination terminal extraction unit 300 extracts a signal that corresponds to the bandwidth of a destination terminal from the digital IF signal and outputs the extracted IF signal. The signal processing circuit 400 demodulates the IF signal and outputs a stereo composite signal that serves as a baseband signal. The stereo demodulation circuit 500 outputs signals that correspond to a right channel (Rch) and a left channel (Lch) from the stereo composite signal. The de-emphasis circuit 600 attenuates the high frequencies of the Rch signal and the Lch signal which are previously emphasized at a transmitting end, and outputs them as voice signals to the Rch and the Lch.

The signal processing circuit according to this embodiment is described hereinafter with reference to FIG. 1. Referring to FIG. 1, the signal processing circuit 400 of this embodiment includes an FM demodulator 1, an electric field strength detection unit 2, a noise removal unit (blender) 3, a drop amount detection unit (electric field strength change amount detection unit) 4, and a blending ratio determination unit 5.

The FM demodulator 1 demodulates a FM-modulated radio signal and obtains a baseband signal (demodulated signal). In FM stereo broadcasting, the baseband signal is a stereo composite signal. The electric field strength detection unit 2 detects the electric field strength of the received radio signal and outputs a signal that indicates the electric field strength (which is referred to hereinafter as an electric field strength signal). The noise removal unit 3 reduces the noise of the demodulated signal which is demodulated by the FM demodulator 1 and outputs the signal. The noise removal unit 3 blends the demodulated signal from the FM demodulator 1 and a signal in which the noise component of the demodulated signal is reduced and outputs the result. Thus, the noise removal unit 3 is a blender that blends a demodulated signal and a noise-reduced signal. A detail of the operation, such as how to determine a blending ratio, is described later. The drop amount detection unit 4 detects an instant drop of electric field strength and outputs a signal that indicates the amount of the drop. Thus, the drop amount detection unit 4 is an electric field strength change amount detection unit that detects a change in electric field strength. The blending ratio determination unit 5 calculates a ratio of a demodulated signal and a noise-reduced signal to be blended in the noise removal unit 3 from the amount of the drop of electric field strength which is detected by the drop amount detection unit 4, and outputs a signal that indicates the blending ratio.

In the signal processing circuit of this embodiment, the FM demodulator 1 demodulates a FM-modulated signal and generates a demodulated signal. The demodulated signal is input to the noise removal unit 3. The noise removal unit 3 performs noise reduction of the demodulated signal. The noise removal unit 3 blends the demodulated signal with a signal (which is referred to hereinafter as a noise-reduced signal) that is generated by filtering the demodulated signal through a low-pass filter (LPF) to reduce noise component, and outputs an output signal. The ratio of blending the demodulated signal and the noise-reduced signal is calculated by the blending ratio determination unit 5. The noise removal unit 3 outputs the demodulation signal with reduced noise component. The signal that is output from the noise removal unit 3 is supplied as a stereo composite signal to a circuit in a subsequent stage or the like.

The configuration of the signal processing circuit is described hereinbelow in further detail. The noise removal unit 3 of this embodiment includes the LPF 31, which is described above, attenuators 32 and 33, and an adder 34. The attenuator 32 receives the demodulated signal that is output from the FM demodulator 1. The attenuator 32 attenuates the demodulated signal based on the blending ratio 1−α (α is a value less than 1) that is calculated by the blending ratio determination unit 5, which is described in detail later, and outputs the attenuated signal.

The LPF 31 receives the demodulated signal. The LPF 31 allows the low frequency component of the demodulated signal to pass through and attenuates the high frequency component. The LPF 31 attenuates the high frequency component to thereby reduce the noise component that is included in the demodulated signal. The output signal of the LPF 31 is the noise-reduced signal. The attenuator 33 attenuates the noise-reduced signal which is output from the LPF 31 based on the blending ratio α that is calculated by the blending ratio determination unit 5, which is described in detail later, and outputs the attenuated signal. The adder 34 adds (blends) the demodulated signal and the noise-reduced signal which are attenuated by the attenuators 32 and 33, respectively, and outputs a stereo composite signal.

The drop amount detection unit 4 includes an envelope detector 41 and a subtractor 42. The envelope detector 41 outputs a signal that corresponds to the envelope of an electric field strength signal which is output from the electric field strength detection unit 2. The subtractor 42 subtracts the electric field strength signal from the signal corresponding to the envelope of electric field strength which is output from the envelope detector 41. From the subtraction, the subtractor 42 detects the drop amount of the electric field strength and outputs it as a drop amount signal.

The blending ratio determination unit 5 includes an operation start point setting register 51, a slope setting register 52, a blending amount calculator 53, and an α adjuster 54. The operation start point setting register 51 is a storage unit for storing a prescribed drop amount. If the drop amount indicated by the drop amount signal exceeds the prescribed drop amount, the blending amount calculator 53 calculates a blending amount.

The slope setting register 52 is a storage unit for storing the relationship of a blending amount with respect to a drop amount. The blending amount calculator 53 calculates the blending amount of the noise-reduced signal with the demodulated signal based on the prescribed amount which is stored in the operation start point setting register 51 and the relationship between the drop amount and the blending amount which is stored in the slope setting register 52, and outputs the result. The α adjuster 54 adjusts the value of α to be $0 \leq \alpha \leq 1$ based on the blending amount that is calculated by the blending amount calculator 53 and outputs the result.

FIGS. 2A to 2H show the waveforms that are output from the components of this embodiment. The operation of the signal processing circuit according to this embodiment is described hereinafter with reference to FIGS. 1 and FIGS. 2A to 2H. The radio signal which is received by an antenna is converted into an intermediate frequency (IF) signal and then input to the signal processing circuit of this embodiment through an IF amplifier (not shown) or the like (cf. Point A in FIG. 1, FIG. 2A). The electric field strength detection unit 2 measures the electric field strength of the IF signal and outputs an electric field strength signal (cf. Point B in FIG. 1, FIG. 2B). FIG. 2B represents the measured electric field strength on the vertical logarithmic axis. Although the other waveforms are represented based on a change in the electric field strength on the vertical logarithmic axis in FIG. 2, the logarithmic scale is not necessarily on the vertical axis as long as the waveform indicates the electric field strength.

The electric field strength signal is input to the drop amount detection unit 4. In the drop amount detection unit 4, the envelope detector 41 detects the signal corresponding to the envelope of the electric field strength signal and outputs it (cf. Point C in FIG. 1, FIG. 2C). A detail of the envelope detection is described later. The subtractor 42 subtracts the electric field strength signal from the envelope of the electric field strength signal which is output from the envelope detector 41 to thereby detect the amount of the drop of the input electric field strength signal, and outputs a drop amount detection result (Point D in FIG. 1, FIG. 2D). As described above, a difference between the electric field strength signal and the signal output from the envelope detector 41 is a drop amount. The drop amount detection unit 4 outputs a signal that indicates the difference. In this manner, the drop amount detection unit 4 detects a change in electric field strength by subtracting the electric field strength signal from the signal indicating the envelope of the electric field strength. Thus, the drop amount detection unit 4 outputs a signal corresponding to a change in electric field strength upon an abrupt change of electric field strength or the like.

The drop amount detection result is input to the blending ratio determination unit 5. In the blending ratio determination unit 5, the blending amount calculator 53 calculates a blending amount. Specifically, the blending amount calculator 53 calculates a blending amount if there is the drop amount that exceeds the prescribed amount which is stored in the operation start point setting register 51. In this embodiment, the blending amount is determined based on the linear function of a drop amount and a blending amount. The slope of the linear function is stored in the slope setting register 52. The blending amount which is calculated based on the drop amount is input to the α adjuster 54. The α adjuster 54 adjusts the calculated blending amount to fall within the range of $0 \leq \alpha \leq 1$ and outputs the blending ratio (cf. Point E in FIG. 1, FIG. 2E). In this embodiment, the blending amount calculator 53 calculates a blending amount with respect to a drop amount using the linear function. Thus, if the calculated value of the blending amount is higher than 1 or lower than 0, the adjustment in the α adjuster 54 clips the output to α=1 or α=0.

On the other hand, the IF signal which is input to the signal processing circuit 400 of this embodiment is demodulated into a demodulated signal by the FM demodulator 1 (cf. Point F in FIG. 1, FIG. 2F). The demodulated signal is divided into the signal which is input to the attenuator 32 without any change and the signal which is input to the attenuator 33 through the LPF 31. The signal which has passed through the LPF 31 becomes a noise-reduced signal in which an abrupt change such as noise is suppressed (cf. Point G in FIG. 1, FIG. 2G). The noise can be reduced by setting the cutoff frequency of the LPF 31 to 2 kHz, for example, so as to filter out the pulse-shaped noise. The attenuators 32 and 33 attenuate the demodulated signal and the noise-reduced signal based on the blending ratios 1−α and α, respectively, which are output from the above-described blending ratio determination unit 5. The outputs of the attenuators 32 and 33 are added together by the adder 34. As a result of the addition, the attenuated demodulated signal and the attenuated noise-reduced signal are blended together, so that a stereo composite signal is output (cf. Point H in FIG. 1, FIG. 2H).

As described above, this embodiment calculates the drop amount of electric field strength (change in electric field strength) and calculates a blending ratio between a demodulated signal and a noise-reduced signal based on the drop amount. It is thereby possible to reduce multipath noise or the like without deteriorating the sound quality compared with the case of setting the output of a stereo composite signal to a constant level or deadening the sound. Further, in this embodiment, the blending amount changes constantly according to the drop amount of electric field strength. Specifically, the blending amount is large when the drop amount is large, and the blending amount is small when the drop amount is small. The blending is performed only in the moment when multipath noise is generated, so that a change in the blending ratio follows substantially the noise component only. There is thus little sound fluctuation, making it possible to deal with sudden noise.

The detection of a signal corresponding to an envelope according to this embodiment is described hereinafter. The circuit that detects a signal corresponding to an envelope may be composed of a storage cell and a comparator, for example. The storage cell stores a value S(N) of an electric field strength signal which is input in the Nth order, for example. The comparator then compares a value S(N+1) of an electric field strength signal which is input in the (N+1)th order with the value S(N) which is stored in the storage cell. If the input value S(N+1) is larger than the stored value S(N), the input value S(N+1) is stored in the storage cell. If, on the other hand, the input value S(N+1) is smaller than the stored value S(N), a prescribed amount Q is subtracted from the stored value S(N), and a value S(N)−Q, for example, is newly stored into the storage cell. In such a configuration, although the output is not an accurate envelope, it is possible to set a signal that is substantially equal to the envelop which follows the peak of an input signal in a simple circuit configuration. FIG. 3 shows an envelope signal that is detected as described above. In the above-described method of detecting a signal corresponding to an envelope according to this embodiment, the waveform decreases with time, following the peak of an electric field strength signal. Upon input of a value that is larger than the electric field strength signal which is stored in the storage cell, the waveform then follows the value of the electric field strength signal.

If a signal processing circuit has enough area or scale, a signal corresponding to an envelope is not necessarily detected by the above method but may be detected by observing input signals for a certain period and linking the peaks in the period to thereby output a normal envelope, which equally functions as an envelope detector of this embodiment.

Second Embodiment

FIG. 4 is a block diagram showing a signal processing circuit according to a second embodiment of the present invention. In FIG. 4, the corresponding elements to those in FIG. 1 are denoted by the same reference numerals and they are not described in detail herein. In this embodiment, a 19 kHz level detection unit 6 and a blending On/Off controller (blending operation controller) 55 are added to the configuration of the first embodiment.

The 19 kHz level detection unit 6 detects the level of the 19 kHz component which is included in a demodulated signal that is output from the FM demodulator 1, and outputs the detection result. The blending On/Off controller 55 determines whether or not to perform the blending operation based on the level of the 19 kHz component which is included in the demodulated signal and the level of electric field strength, and controls the bending operation in the noise removal unit 3. The operation of the signal processing circuit according to the second embodiment, particularly a difference from the first embodiment, is described hereinafter.

If there is multipath noise, the level of the 19 kHz component which is included in the demodulated signal that is demodulated by the FM demodulator 1 becomes higher. Further, if the electric field strength of a received signal becomes smaller, the level of the 19 kHz component of the demodulated signal also becomes higher regardless of the presence or absence of multipath noise. To address this, the present embodiment performs, in view of electric field strength, blending based on the blending ratio that is calculated by the blending ratio determination unit 5 when the level of the 19 kHz component which is detected by the 19 kHz level detection unit 6 exceeds a prescribed level. When, on the other hand, the level of the 19 kHz component is below a prescribed level, it fixes the output to α=0, for example, regardless of the calculation result of the blending ratio determination unit 5 so as not to perform the blending operation.

The blending On/Off controller 55 receives the signal that indicates the level of the 19 kHz component in a demodulated signal which is detected by the 19 kHz level detection unit 6, the signal that indicates electric field strength which is detected by the electric field strength detection unit 2, and the blending ratio which is output from the α adjuster 54.

Figure 5:
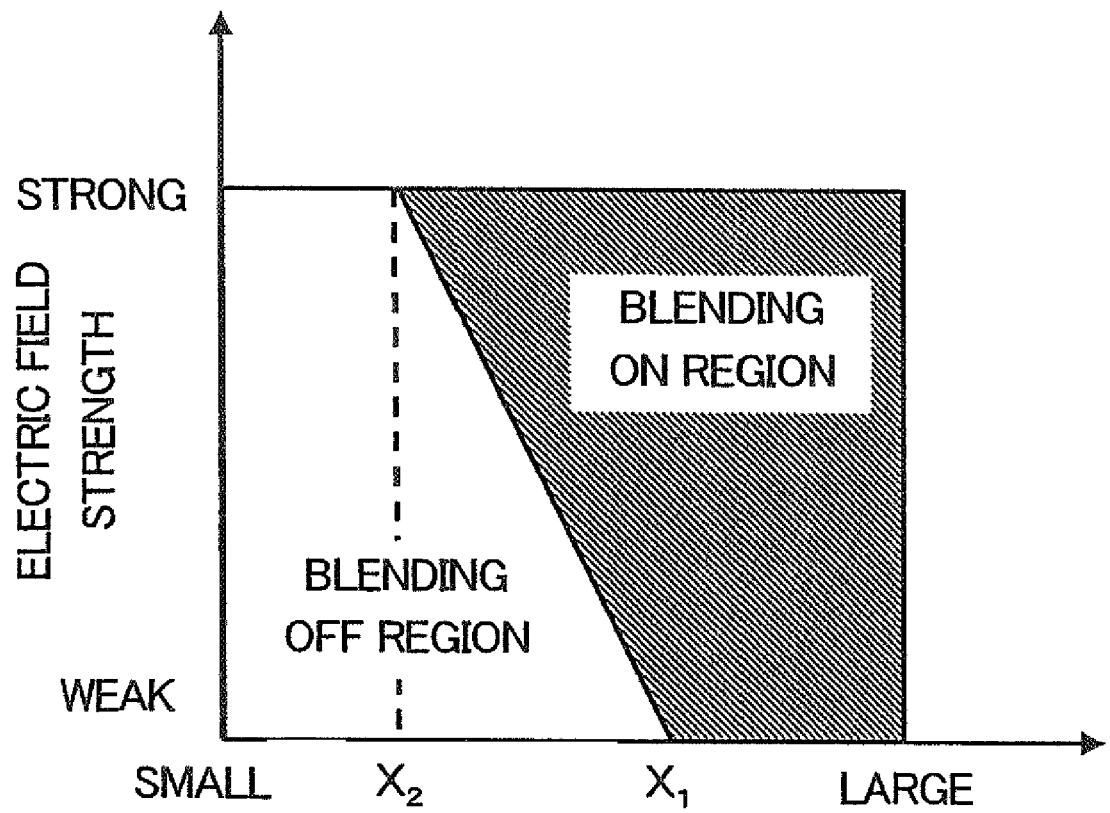
FIG. 5 is a view showing the relationship between electric field strength and a level of 19 kHz component at which the blending operation is started.

The blending On/Off controller 55 includes an internal register or the like to store a prescribed level of 19 kHz component at which the blending operation is started according to electric field strength. FIG. 5 is a view showing the relationship between the electric field strength and the level of 19 kHz component at which the blending operation is started which is stored in the blending On/Off controller 55 As described above, the 19 kHz component in a demodulated signal is large when the electric field strength of a received signal is small. Thus, the blending On/Off controller 55 of this embodiment sets the slope corresponding to electric field strength to a prescribed value at which the blending operation is started as shown in FIG. 5. Specifically, the blending On/Off controller 55 stores a prescribed value so that the relationship of $X_1 > X_2$ is satisfied where the level of 19 kHz component at which blending operation is started when electric field strength is small is $X_1$ and the level of 19 kHz component at which blending operation is started when electric field strength is large is $X_2$.

Because the signal processing circuit of this embodiment determines On or Off of the blending operation based on the level of 19 kHz component which is detected by the 19 kHz level detection unit 6, it prevents the deterioration of sound quality due to malfunction or the like when there is no multipath noise, in addition to having the effects of the first embodiment. Further, this embodiment outputs the signal which does not pass through the LPF 31 when there is substantially no multipath. If a signal passes the LPF 31, the signal in a higher frequency band than a certain level is removed together with multipath noise. This can produce muffled sound due to distortion of original sound. Further, if the LPF 31 eliminates a pilot signal that is included in a stereo composite signal, proper processing cannot be performed in a circuit of a subsequent stage. Therefore, performing the blending On/Off control based on the presence or absence of multipath noise enables output of a stereo composite signal with higher sound quality. Although this embodiment detects the presence or absence of multipath noise based on the level of 19 kHz component which is included in a demodulated signal, the same operation as this embodiment can be performed also by detecting 19 kHz component which is included in an output of the electric field strength detection unit 2.

Third Embodiment

Figure 6:
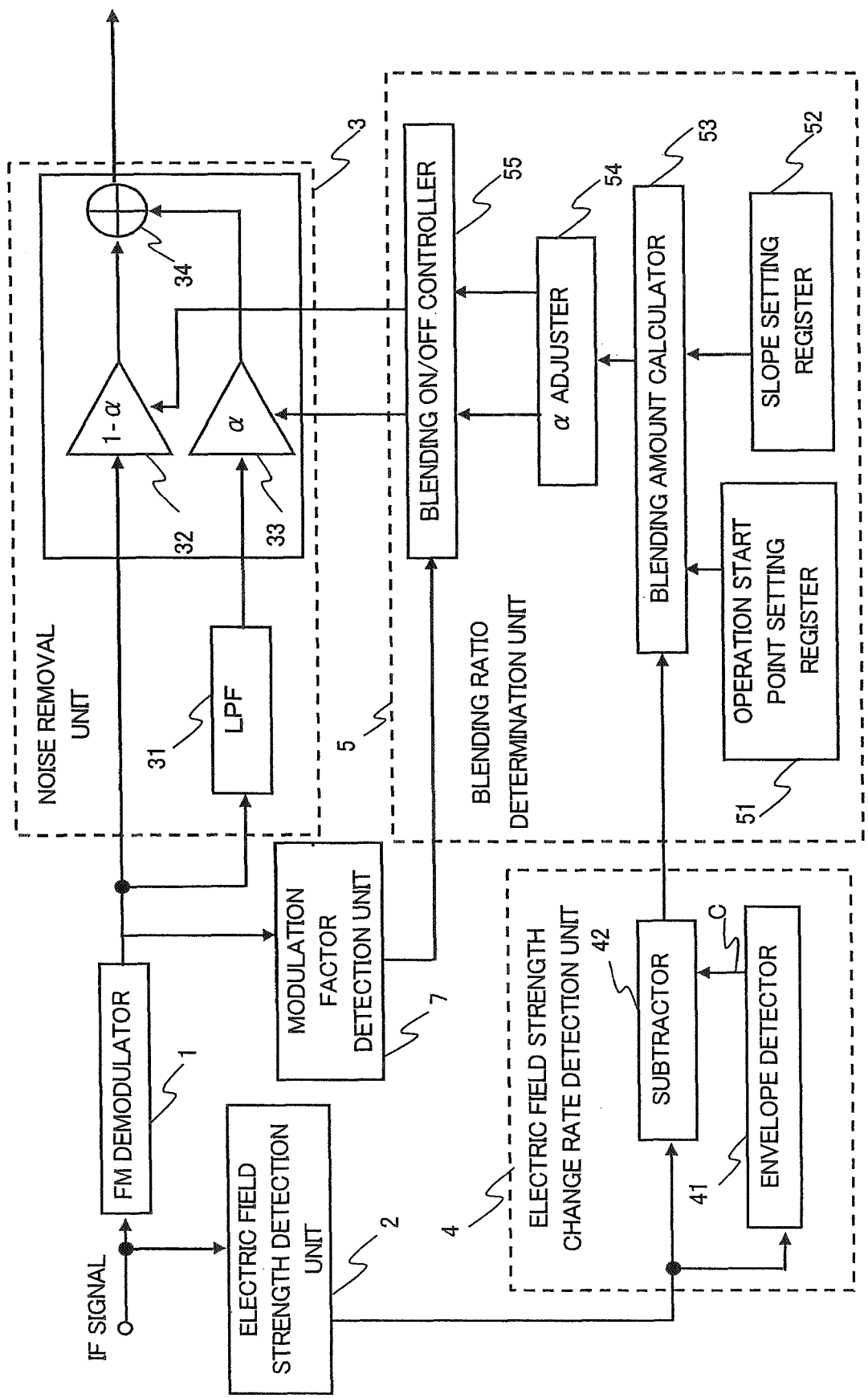
FIG. 6 is a block diagram showing a signal processing circuit according to a third embodiment of the present invention.

FIG. 6 is a block diagram showing a signal processing circuit according to a third embodiment of the present invention. In FIG. 6, the corresponding elements to those in FIG. 1 are denoted by the same reference numerals and they are not described in detail herein. In this embodiment, a modulation factor detection unit 7 and the blending On/Off controller 55 are added to the configuration of the first embodiment.

The modulation factor detection unit 7 detects a modulation factor of a demodulated signal that is output from the FM demodulator 1 and outputs a detection result. The blending On/Off controller 55 determines whether or not to perform the blending operation based on the level of the modulation factor of the demodulated signal, and controls the blending operation in the noise removal unit 3. The operation of the signal processing circuit according to the third embodiment, particularly a difference from the first embodiment, is described hereinafter.

Figure 7:
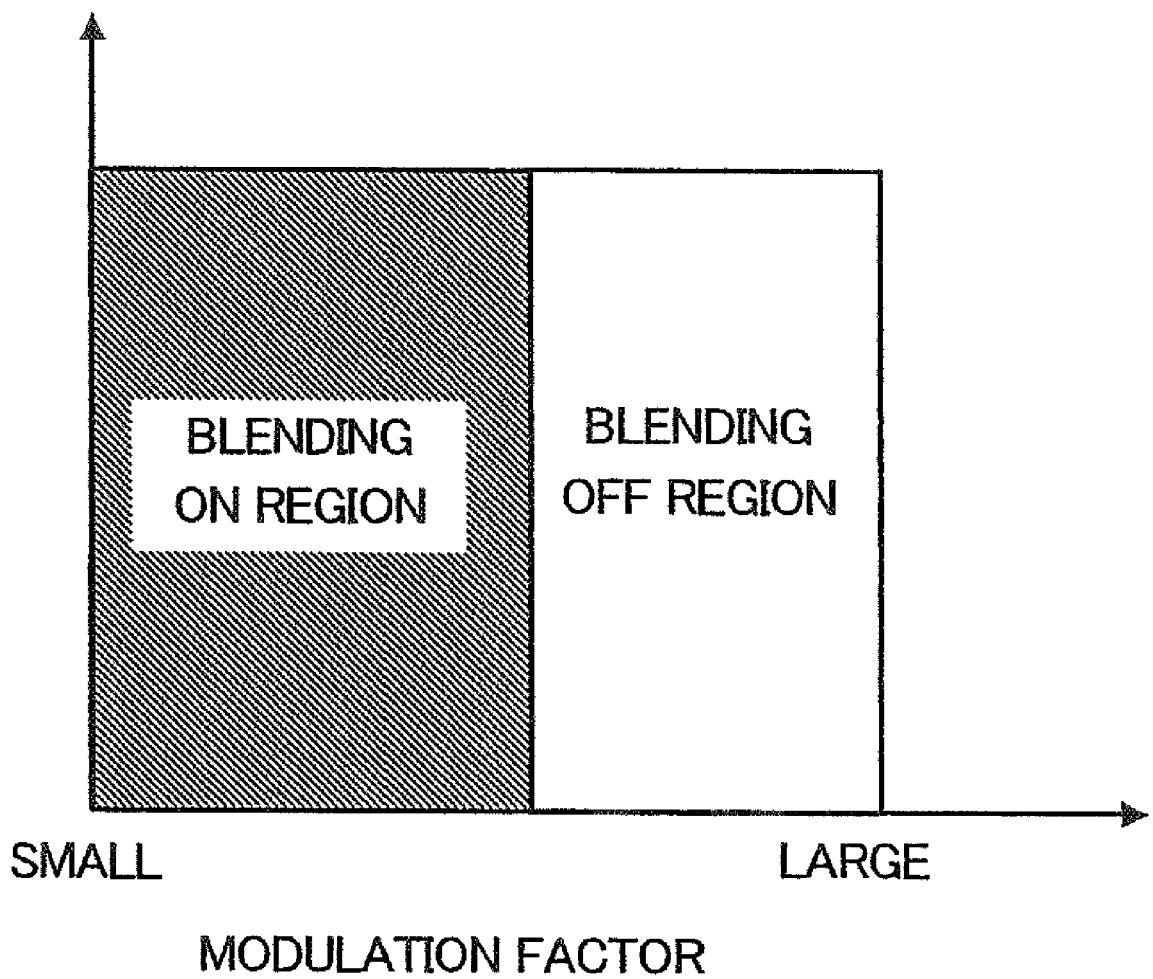
FIG. 7 is a view showing the relationship between a modulation factor and blending operation.

If a modulation factor is large, a demodulated signal becomes a large-volume signal. Accordingly, the noise component which is included in the demodulated signal is not significant. The modulation factor detection unit 7 detects a modulation factor of a demodulated signal and outputs a detection result to the blending On/Off controller 55. When a modulation factor of a demodulated signal exceeds a predetermined level, the blending On/Off controller 55 does not perform the blending operation and outputs a fixed value such as α=0. When a modulation factor does not exceed the predetermined level, the blending On/Off controller 55 outputs a signal that indicates the blending ratio which is calculated by the blending ratio determination unit 5 as shown in FIG. 7.

In such a configuration, the signal processing circuit of this embodiment can produce a stereo composite signal with higher sound quality that has not passed through the LPF 31 for a signal with a large modulation factor, in addition to having the effects of the first embodiment.

Fourth Embodiment

Figure 8:
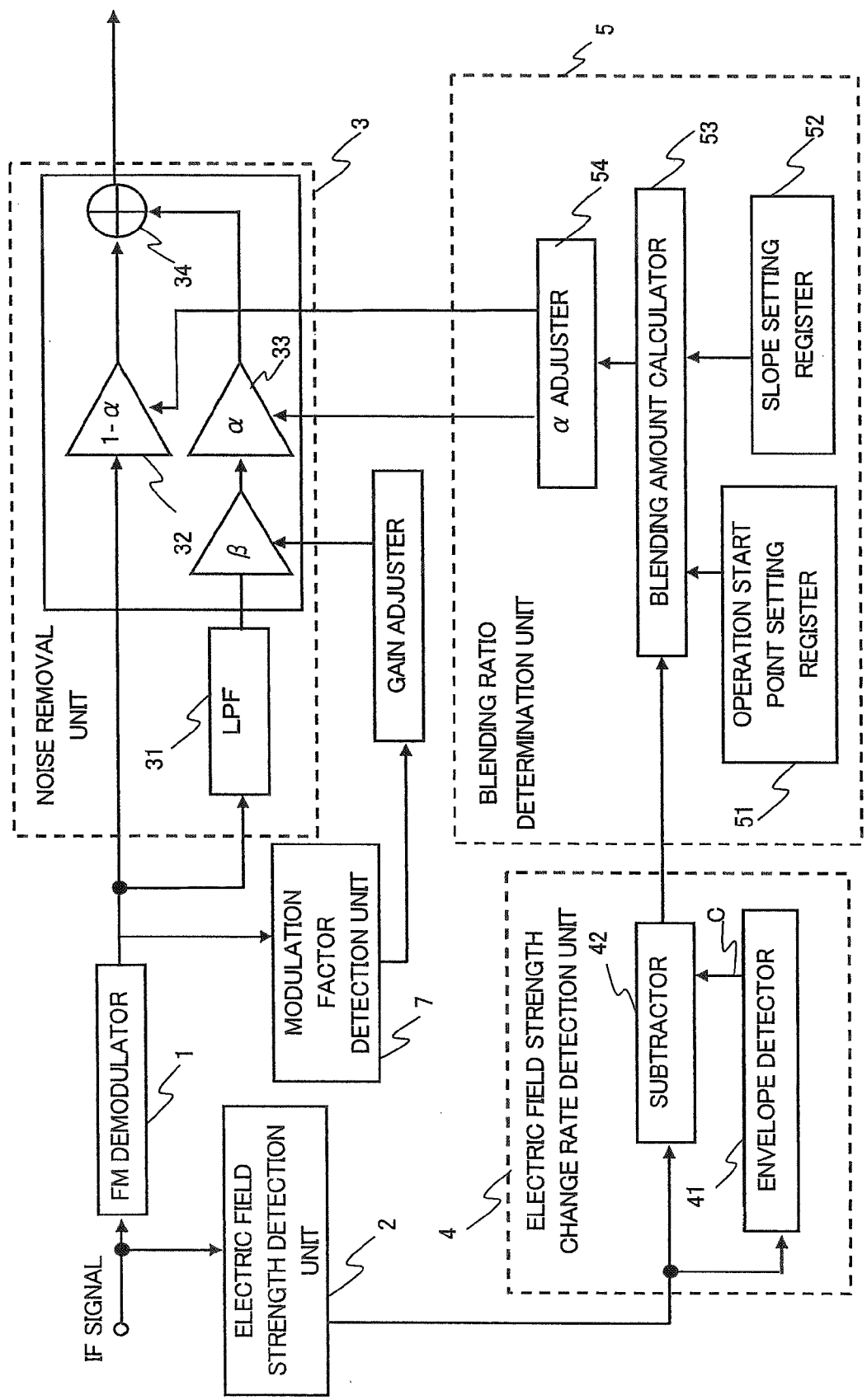
FIG. 8 is a block diagram showing a signal processing circuit according to a fourth embodiment of the present invention.

FIG. 8 is a block diagram showing a signal processing circuit according to a fourth embodiment of the present invention. In FIG. 8, the corresponding elements to those in FIGS. 1 and 6 are denoted by the same reference numerals, and they are not described in detail herein. In this embodiment, the modulation factor detection unit 7, an attenuator 35, and a gain adjuster 8 are added to the configuration of the first embodiment. The attenuator 35 is placed between the LPF 31 and the attenuator 33.

The modulation factor detection unit 7 detects a modulation factor of a demodulated signal that is output from the FM demodulator 1 and outputs a detection result. The gain adjuster 8 controls a gain (attenuation factor) of the attenuator 35 in the noise removal unit 3 based on the level of the modulation factor of the demodulated signal. In the above-described embodiments, multipath noise is filtered out through the LPF 31. However, noise exists in a low frequency component also, and the noise in the low frequency component passes through the LPF 31. Referring back to FIG. 2G, the distorted portions along the sine wave are such noise. Such noise is audible when a modulation factor is small because the volume of a demodulated signal is small. To address this, the present embodiment reduces the significance of noise by decreasing the gain of the output of the LPF 31 with a decrease in modulation factor. The operation of the signal processing circuit according to the fourth embodiment, particularly a difference from the first embodiment, is described hereinafter.

Figure 9:
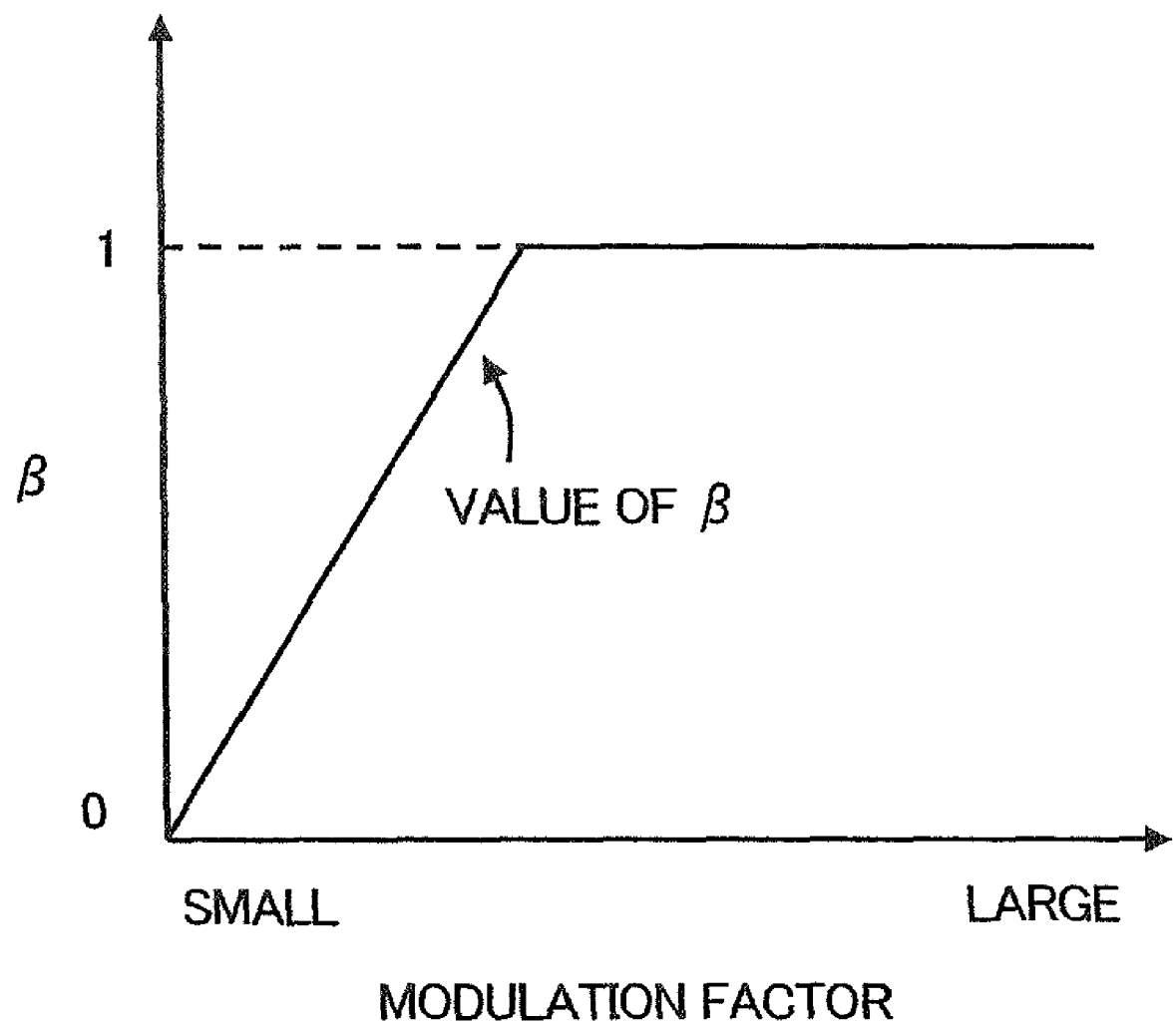
FIG. 9 is a view showing the relationship between a modulation factor and a gain of an attenuator 35.

The modulation factor detection unit 7 detects a modulation factor of a demodulated signal and outputs a detection result to the gain adjuster 8. When a modulation factor of a demodulated signal falls below a predetermined value, the gain adjuster 8 outputs a signal that controls the gain β of the attenuator 35 to decrease gradually according to a decrease in the modulation factor. The gain β decreases with a constant slope as the modulation factor decreases, and it becomes 0 when the modulation factor is significantly small as shown in FIG. 9. The attenuator 35 attenuates the output of the LPF 31 based on the output of the gain adjuster 8.

In such a configuration, the signal processing circuit of this embodiment can reduce the significance of noise when a modulation factor is small and thereby produce a stereo composite signal with higher sound quality.

Fifth Embodiment

Figure 10:
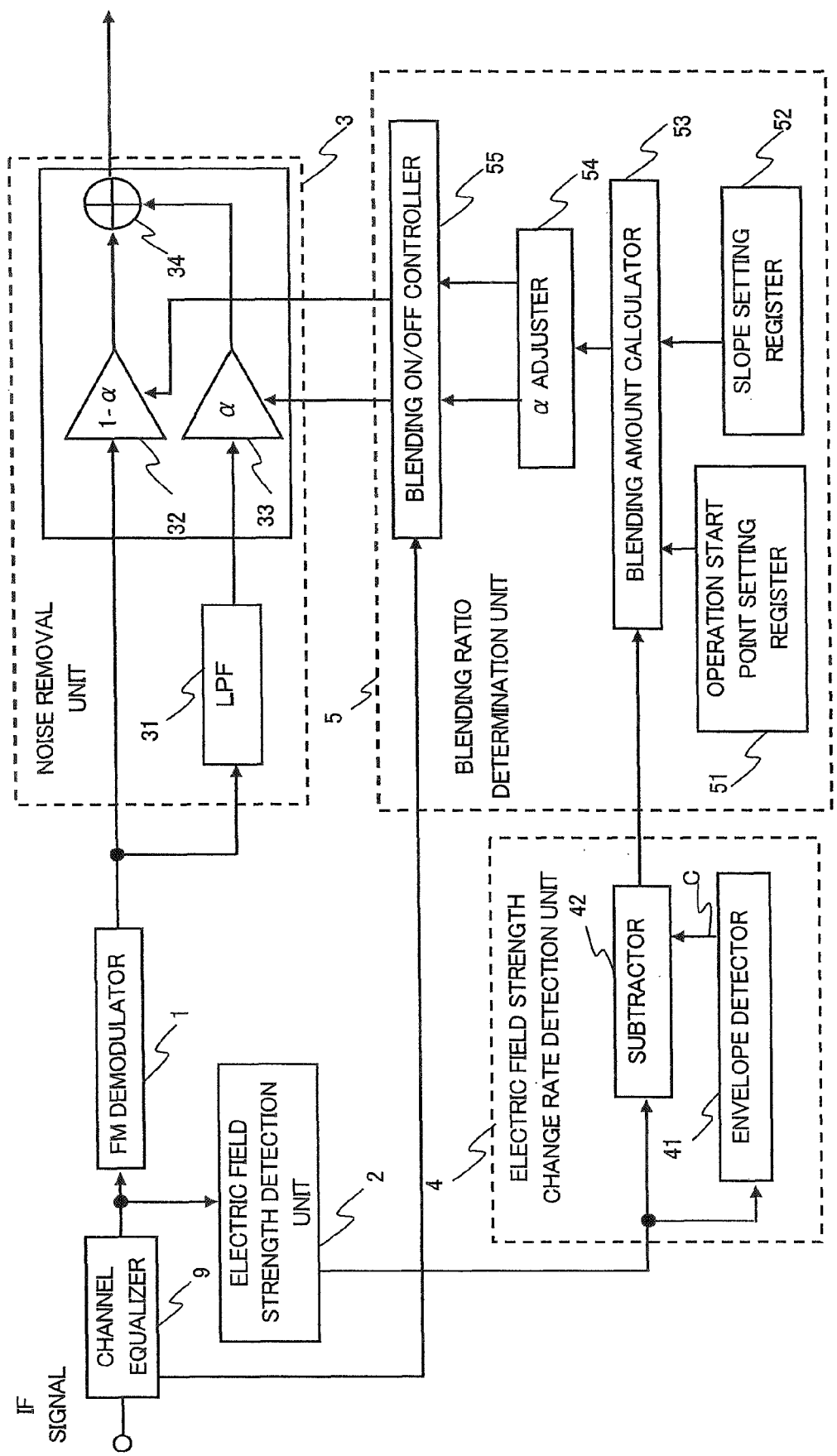
FIG. 10 is a block diagram showing a signal processing circuit according to a fifth embodiment of the present invention.
Figure 11:
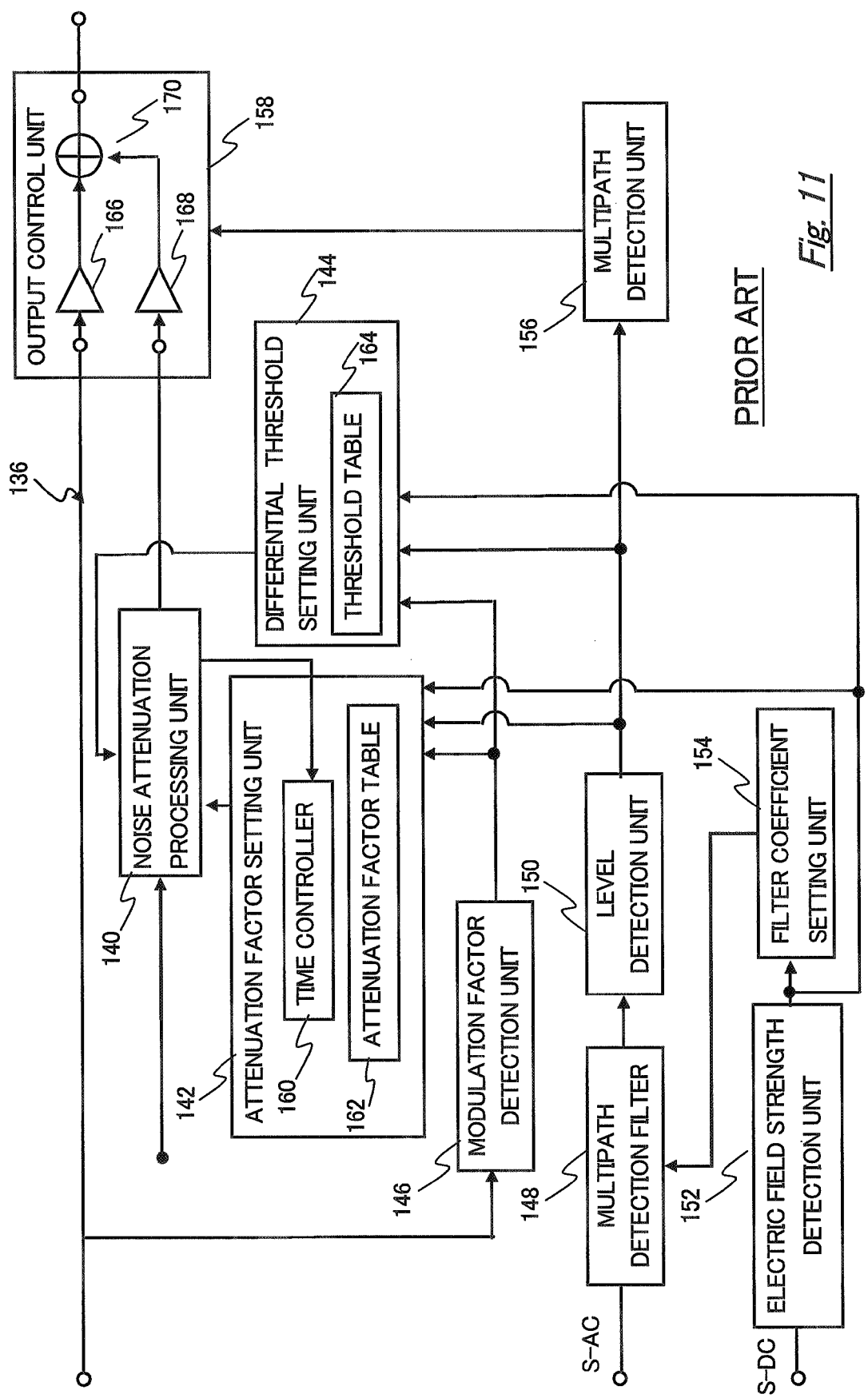
FIG. 11 is a block diagram showing a signal processing circuit according to a related art.
Figure 12:
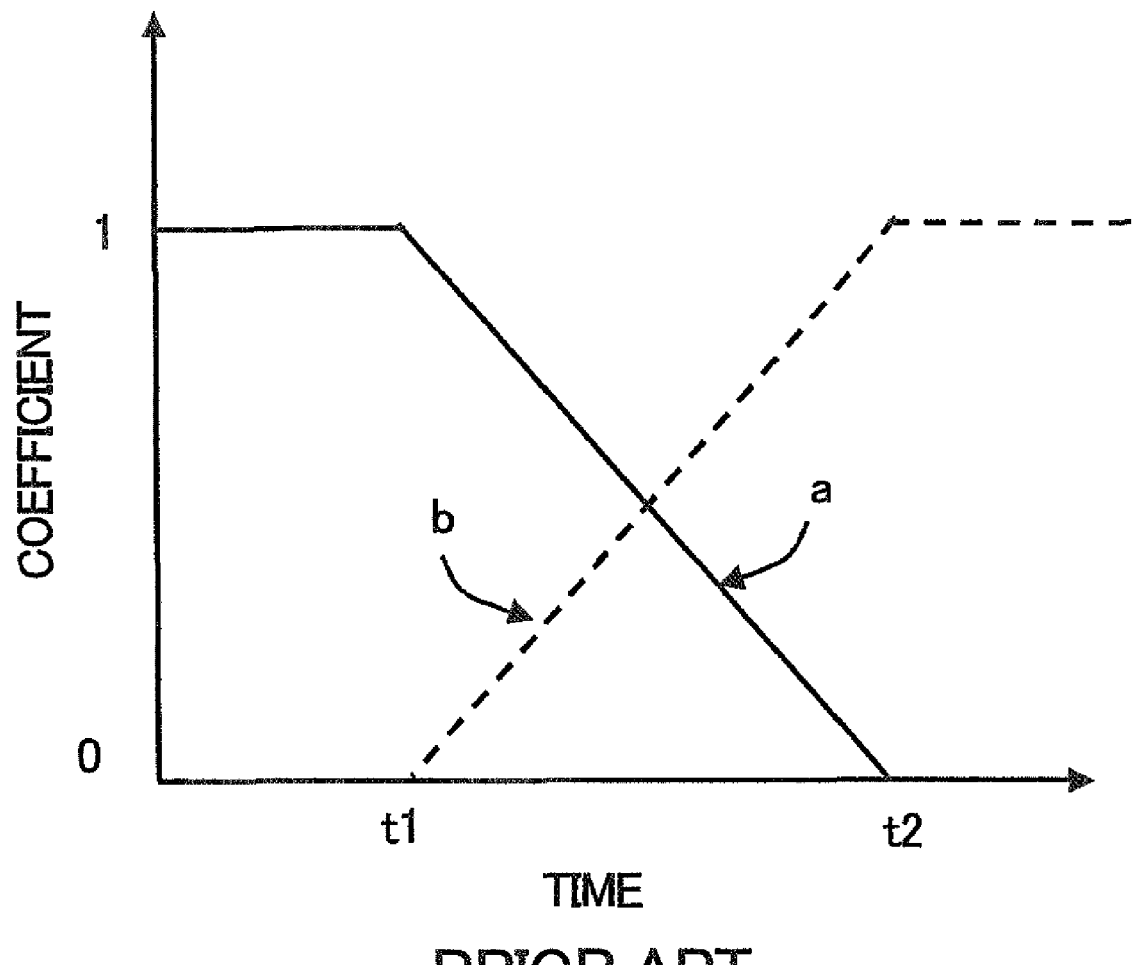
FIG. 12 is a view showing the output control of the signal processing circuit according to the related art.

FIG. 10 is a block diagram showing a signal processing circuit according to a fifth embodiment of the present invention. In FIG. 10, the corresponding elements to those in FIG. 1 are denoted by the same reference numerals, and they are not described in detail herein. In this embodiment, a channel equalizer 9 and the blending On/Off controller 55 are added to the configuration of the first embodiment. The channel equalizer 9 is placed in the previous stage of the FM demodulator 1 and the electric field strength detection unit 2. The blending On/Off controller 55 controls the blending operation in the noise removal unit 3 based on the operation of the channel equalizer 9.

In order to reduce the effect of multipath, a signal processing circuit may include an equalizer, which is called a channel equalizer, in the previous stage. If the signal processing circuit includes the channel equalizer 9, the position of the drop of electric field strength which is detected by the electric field strength detection unit 2 and the drop amount detection unit 4 sometimes does not correspond to the position of noise. To address this, the signal for controlling On/Off of the channel equalizer 9 is also input to the blending on/off controller 55 in this embodiment.

In the fifth embodiment, the operations of the channel equalizer 9 and the blending On/Off controller 55 are complementary to each other. Specifically, if the channel equalizer 9 is on, the blending operation is Off, and the blending on/off controller 55 outputs a fixed value such as $\alpha=0$. If, on the other hand, the channel equalizer 9 is off, the blending operation is On, and the blending On/Off controller 55 outputs the blending ratio which is calculated by the blending ratio determination unit 5 to the noise removal unit 3. Thus, the blending On/off controller 55 can operate based on the same signal as the signal that indicates On/Off to the channel equalizer 9.

In such a configuration, even if a signal processing circuit includes a channel equalizer, it is possible to ensure noise reduction when the channel equalizer is not in operation.

Although some embodiments of the present invention are described in detail in the foregoing, the present invention is not limited to the above-described embodiments but may be varied in many ways. For example, although the slope setting register stores a blending amount with respect to a drop amount using the linear function, it may pre-store a table which defines the relationship of a blending ratio with respect to a drop amount. In such a case, the blending amount calculator may determine a blending ratio by reading a value stored in the slope setting register based on the level of an input drop amount, without performing the adjustment of the blending ratio by the $\alpha$ adjuster.

Further, a signal processing circuit may be implemented by appropriately combining the embodiments described above. In this way, equivalent alterations and modifications will occur to those skilled in the art without departing from the scope and spirit of the present invention.

Finally, various aspects of the present invention are summarized as follow.

According to an aspect of the present invention, there is provided a signal processing circuit including a demodulator to demodulate a received signal and output a demodulated signal, a filter to output a signal corresponding to a prescribed frequency component of the demodulated signal, a blending unit to blend the demodulated signal with an output signal of the filter at a prescribed blending ratio, an electric field strength change amount detection unit to detect a change in electric field strength and output an electric field strength change amount and a blending ratio determination unit to determine the prescribed blending ratio according to the electric field strength change amount.

In the above described processing circuit, the electric field strength change amount detection unit includes an envelope detector to output an envelope signal corresponding to an envelope of the electric field strength and a subtractor to subtract a signal indicating the electric field strength from the envelope signal.

In the above described processing circuit, the blending unit includes a first attenuator to attenuate the demodulated signal based on the prescribed blending ratio, a second attenuator to attenuate the output signal of the filter based on the prescribed blending ratio and an adder to add an output of the first attenuator and an output of the second attenuator together.

In the above described processing circuit, the first attenuator attenuates the demodulated signal by $(1-\alpha)$ times where $\alpha$ is a value less than 1, and the second attenuator attenuates the output signal of the filter by $\alpha$ times.

In the above described processing circuit, the blending ratio determination unit includes a register to store a relationship of a blending amount with respect to the electric field strength change amount and a blending amount calculator to calculate a blending amount based on the electric field strength change amount and the relationship stored in the register.

In the above described processing circuit, the blending ratio determination unit determines the prescribed blending ratio when the electric field strength change amount exceeds a prescribed change amount.

In the above described processing circuit, the circuit includes a specified component detection unit to detect a specified component of the demodulated signal and a blending control unit to control the blending based on electric field strength of the received signal and a detection result of the specified component detection unit.

In the above described processing circuit, the specified component of the demodulated signal is 19 kHz component of the demodulated signal.

In the above described processing circuit, the blending control unit controls the blending unit to start blending when the specified component of the demodulated signal exceeds a prescribed amount, and the prescribed amount is determined based on electric field strength of the received signal.

In the above described processing circuit, the circuit includes a modulation factor detection unit to detect a modulation factor of the demodulated signal and a blending control unit to control the blending based on a detection result of the modulation factor detection unit.

In the above described processing circuit, the circuit includes a modulation factor detection unit to detect a modulation factor of the demodulated signal an attenuator to attenuate a signal corresponding to a specified frequency component of the demodulated signal and a gain adjuster to determine a gain of the attenuator based on a detection result of the modulation factor detection unit.

In the above described processing circuit, the circuit includes a channel equalizer and a blending control unit to control the blending based on operation of the channel equalizer.

In the above described processing circuit, the blending control unit controls blending by the blending unit and equalization by the channel equalizer to be complementary to each other.

According to another aspect of the present invention, there is provided a signal processing circuit that blends a demodulated signal demodulated from a received signal and a signal corresponding to a specified frequency component of the demodulated signal at a prescribed blending ratio. The blending ratio is determined based on a change amount of electric field strength of the received signal.

In the above described signal processing circuit, the change amount of electric field strength of the received signal is calculated by subtracting the electric field strength of the received signal from a waveform corresponding to an envelope of the electric field strength of the received signal.

In the above described signal processing circuit, the blending is performed based on a specified component of the demodulated signal and the electric field strength of the received signal.

In the above described signal processing circuit, the blending is performed when the specified component of the demodulated signal exceeds a prescribed level, and the prescribed level at which the blending is started decreases as the electric field strength of the received signal increases.

In the above described signal processing circuit, the blending is performed based on a modulation factor of the received signal.

In the above described signal processing circuit, a gain of a noise-reduced signal is determined based on a modulation factor of the received signal.

In the above described signal processing circuit, the signal processing circuit includes a channel equalizer, and the blending is not performed when the channel equalizer is in operation.

According to another aspect of the present invention, there is provided a signal processing method that blends a demodulated signal demodulated from a received signal and a signal corresponding to a specified frequency component of the demodulated signal. The signal processing method includes detecting a change amount of electric field strength of the received signal, calculating a blending ratio of the demodulated signal and the signal corresponding to a specified frequency component of the demodulated signal based on the change amount of electric field strength and outputting a signal generated by blending the demodulated signal and the signal corresponding to a specified frequency component of the demodulated signal at the blending ratio.

In the above described signal processing method, the detection of a change amount of electric field strength includes, detecting a waveform corresponding to an envelope of a signal indicating electric field strength, and subtracting the signal indicating electric field strength from the waveform.

In the above described signal processing method, the calculation of a blending ratio includes calculating a blending amount with respect to the change amount of electric field strength detected by the detection, and determining a blending ratio according to the blending amount.

In the above described signal processing method, the blending is performed based on a specified component of the demodulated signal and the electric field strength of the received signal.

In the above described signal processing method, the blending is performed when the specified component of the demodulated signal exceeds a prescribed level, and the prescribed level at which the blending is started decreases as the electric field strength of the received signal increases.

In the above described signal processing method, the blending is performed based on a modulation factor of the received signal.

In the above described signal processing method, a gain of a noise-reduced signal is determined based on a modulation factor of the received signal.

In the above described signal processing method, the blending is not performed during channel equalization.

It is apparent that the present invention is not limited to the above embodiments, but may be modified and changed without departing from the scope and spirit of the invention.

What is claimed is:

1. A signal processing circuit comprising:
   a demodulator to demodulate a received signal and output a demodulated signal;
   a filter to output a signal corresponding to a prescribed frequency component of the demodulated signal;
   a blending unit to blend the demodulated signal with an output signal of the filter at a prescribed blending ratio;
   an electric field strength change amount detection unit to detect a change in electric field strength and output an electric field strength change amount; and
   a blending ratio determination unit to determine the prescribed blending ratio according to the electric field strength change amount.

2. The signal processing circuit according to claim 1, wherein the electric field strength change amount detection unit includes:
   an envelope detector to output an envelope signal corresponding to an envelope of the electric field strength; and
   a subtractor to subtract a signal indicating the electric field strength from the envelope signal.

3. The signal processing circuit according to claim 1, wherein the blending unit includes:
   a first attenuator to attenuate the demodulated signal based on the prescribed blending ratio;
   a second attenuator to attenuate the output signal of the filter based on the prescribed blending ratio; and
   an adder to add an output of the first attenuator and an output of the second attenuator together.

4. The signal processing circuit according to claim 3, wherein
   the first attenuator attenuates the demodulated signal by $(1-\alpha)$ times where $\alpha$ is a value less than 1, and the second attenuator attenuates the output signal of the filter by $\alpha$ times.

5. The signal processing circuit according to claim 1, wherein the blending ratio determination unit includes:
   a register to store a relationship of a blending amount with respect to the electric field strength change amount; and
   a blending amount calculator to calculate a blending amount based on the electric field strength change amount and the relationship stored in the register.

6. The signal processing circuit according to claim 1, wherein the blending ratio determination unit determines the prescribed blending ratio when the electric field strength change amount exceeds a prescribed change amount.

7. The signal processing circuit according to claim 1, further comprising:
   a specified component detection unit to detect a specified component of the demodulated signal; and
   a blending control unit to control the blending based on electric field strength of the received signal and a detection result of the specified component detection unit.

8. The signal processing circuit according to claim 7, wherein the specified component of the demodulated signal is 19 kHz component of the demodulated signal.

9. The signal processing circuit according to claim 7, wherein the blending control unit controls the blending unit to start blending when the specified component of the demodulated signal exceeds a prescribed amount, and the prescribed amount is determined based on electric field strength of the received signal.

10. The signal processing circuit according to claim 1, further comprising:
   a modulation factor detection unit to detect a modulation factor of the demodulated signal; and
   a blending control unit to control the blending based on a detection result of the modulation factor detection unit.

11. The signal processing circuit according to claim 1, further comprising:
   a modulation factor detection unit to detect a modulation factor of the demodulated signal;
   an attenuator to attenuate a signal corresponding to a specified frequency component of the demodulated signal; and
   a gain adjuster to determine a gain of the attenuator based on a detection result of the modulation factor detection unit.

12. The signal processing circuit according to claim 1, further comprising:
   a channel equalizer; and
   a blending control unit to control the blending based on operation of the channel equalizer.

13. The signal processing circuit according to claim 12, wherein the blending control unit controls blending by the blending unit and equalization by the channel equalizer to be complementary to each other.

14. A signal processing circuit that blends a demodulated signal demodulated from a received signal and a signal corresponding to a specified frequency component of the demodulated signal at a prescribed blending ratio, wherein the blending ratio is determined based on a change amount of electric field strength of the received signal.

15. The signal processing circuit according to claim 14, wherein the change amount of electric field strength of the received signal is calculated by subtracting the electric field strength of the received signal from a waveform corresponding to an envelope of the electric field strength of the received signal.

16. A signal processing method that blends a demodulated signal demodulated from a received signal and a signal corresponding to a specified frequency component of the demodulated signal, comprising:
   detecting a change amount of electric field strength of the received signal;
   calculating a blending ratio of the demodulated signal and the signal corresponding to a specified frequency component of the demodulated signal based on the change amount of electric field strength; and
   outputting a signal generated by blending the demodulated signal and the signal corresponding to a specified frequency component of the demodulated signal at the blending ratio.

17. The signal processing method according to claim 16, wherein the detection of a change amount of electric field strength includes:
   detecting a waveform corresponding to an envelope of a signal indicating electric field strength, and
   subtracting the signal indicating electric field strength from the waveform.

18. The signal processing method according to claim 16, wherein the calculation of a blending ratio includes:
   calculating a blending amount with respect to the change amount of electric field strength detected by the detection, and
   determining a blending ratio according to the blending amount.

19. The signal processing method according to claim 16, wherein the blending is performed based on a specified component of the demodulated signal and the electric field strength of the received signal.

20. The signal processing method according to claim 19, wherein the blending is performed when the specified component of the demodulated signal exceeds a prescribed level, and the prescribed level at which the blending is started decreases as the electric field strength of the received signal increases.

* * * * *